Dec. 28, 1965     C. VAN DER LELY ET AL     3,225,434

METHODS OF PREFABRICATING SECTIONS OF BUILDINGS

Filed Oct. 9, 1962     5 Sheets-Sheet 1

INVENTORS
CORNELIS VAN DER LELY
H. J. C. NIEUWENHOVEN
BY
Mason, Mason & Albright
             Attorneys Dec. 28, 1965   C. VAN DER LELY ET AL   3,225,434
METHODS OF PREFABRICATING SECTIONS OF BUILDINGS
Filed Oct. 9, 1962   5 Sheets-Sheet 4
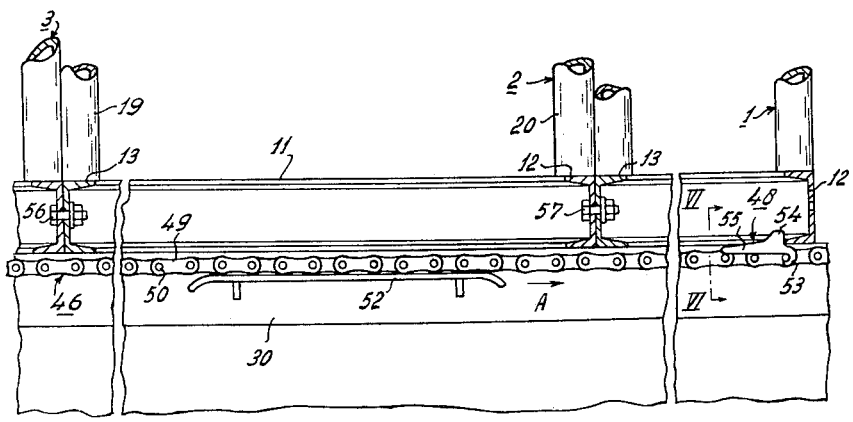
FIG. 5
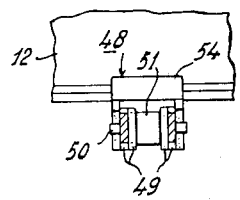
FIG. 6
FIG. 10
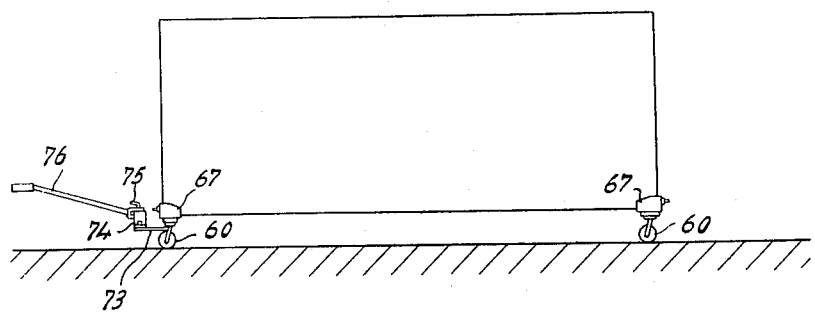
INVENTORS
CORNELIS VAN DER LELY
H. J. C. NIEUWENHOVEN
BY
Mason, Mason & Albright
Attorneys Dec. 28, 1965 C. VAN DER LELY ET AL 3,225,434
METHODS OF PREFABRICATING SECTIONS OF BUILDINGS
Filed Oct. 9, 1962 5 Sheets-Sheet 5
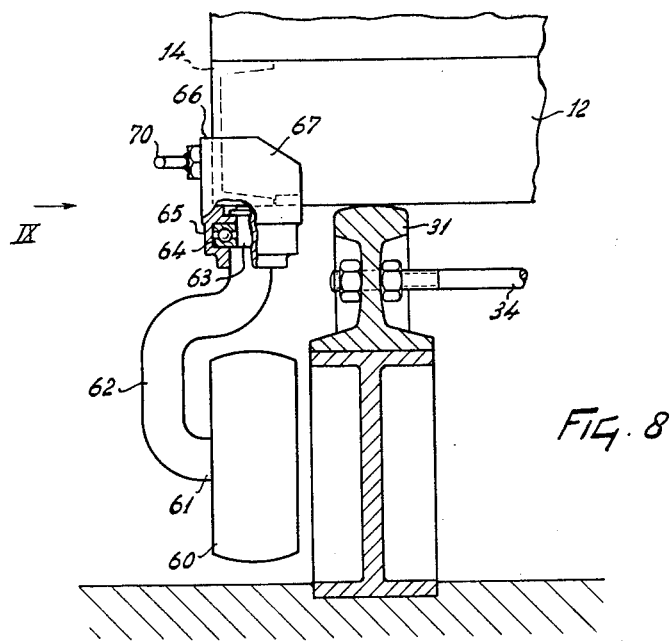
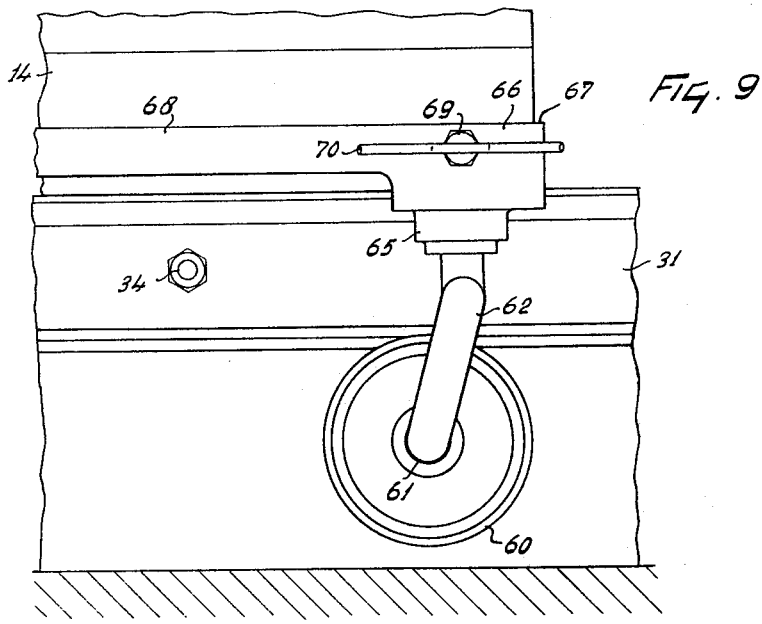
INVENTORS
CORNELIS VAN DER LELY
H. J. C. NIEUWENHOVEN
BY
Mason, Mason & Albright
Attorneys United States Patent Office 3,225,434
Patented Dec. 28, 1965

3,225,434
METHODS OF PREFABRICATING SECTIONS OF BUILDINGS
Cornelis van der Lely, Zug, and Hendricus Jacobus Cornelis Nieuwenhoven, Baar, Switzerland, assignors to C. van der Lely N.V., Maasland, Netherlands, a Dutch limited-liability company
Filed Oct. 9, 1962, Ser. No. 229,408
Claims priority, application Netherlands, Nov. 7, 1961, 271,126
17 Claims. (Cl. 29—430)

This invention relates to a method of prefabricating box-shaped sections for use in assembling buildings.

In accordance with a first aspect of the present invention, there is provided a method of prefabricating box-shaped sections for use in assembling buildings, the sections being arranged to enclose all or part of a living space and being arranged to be fixed together in the assembled building wherein a group of sections which are to adjoin one another in the assembled building, are fixed together at least for the major part of their prefabrication, and are disconnected from one another prior to transport thereof. In this manner, the sections may be made simply and efficiently.

In accordance with a second aspect of the present invention, there is provided a method of prefabricating box-shaped sections for use in assembling buildings, the sections being arranged to enclose all or part of a living space, wherein the sections are continuously moved at least during the major part of their prefabrication. The sections are in this way produced cheaply and rapidly.

Figure 1:
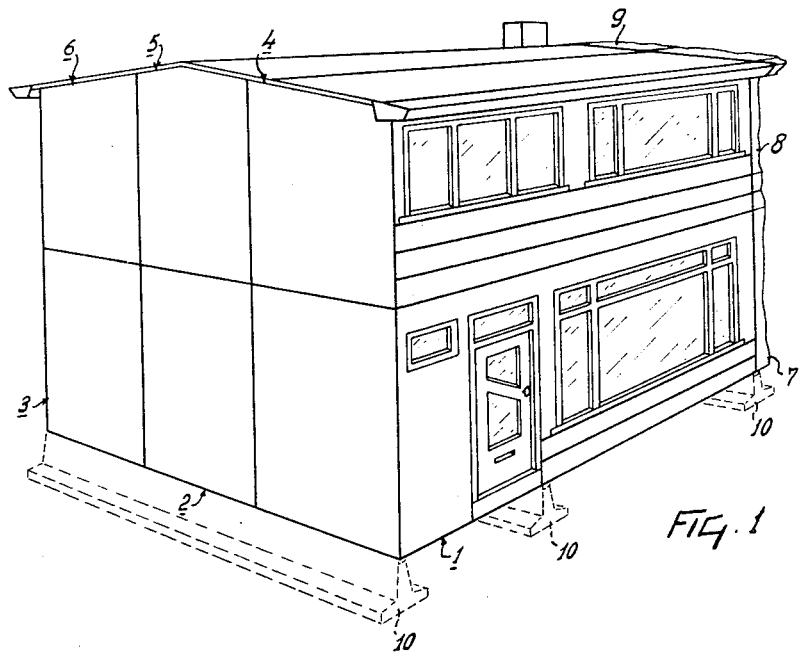
Figure 2:
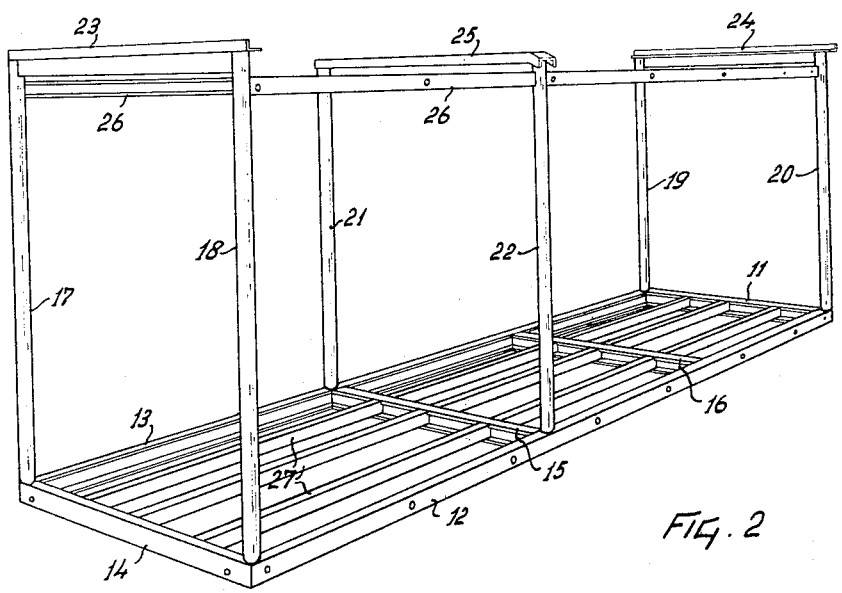
Figure 3:
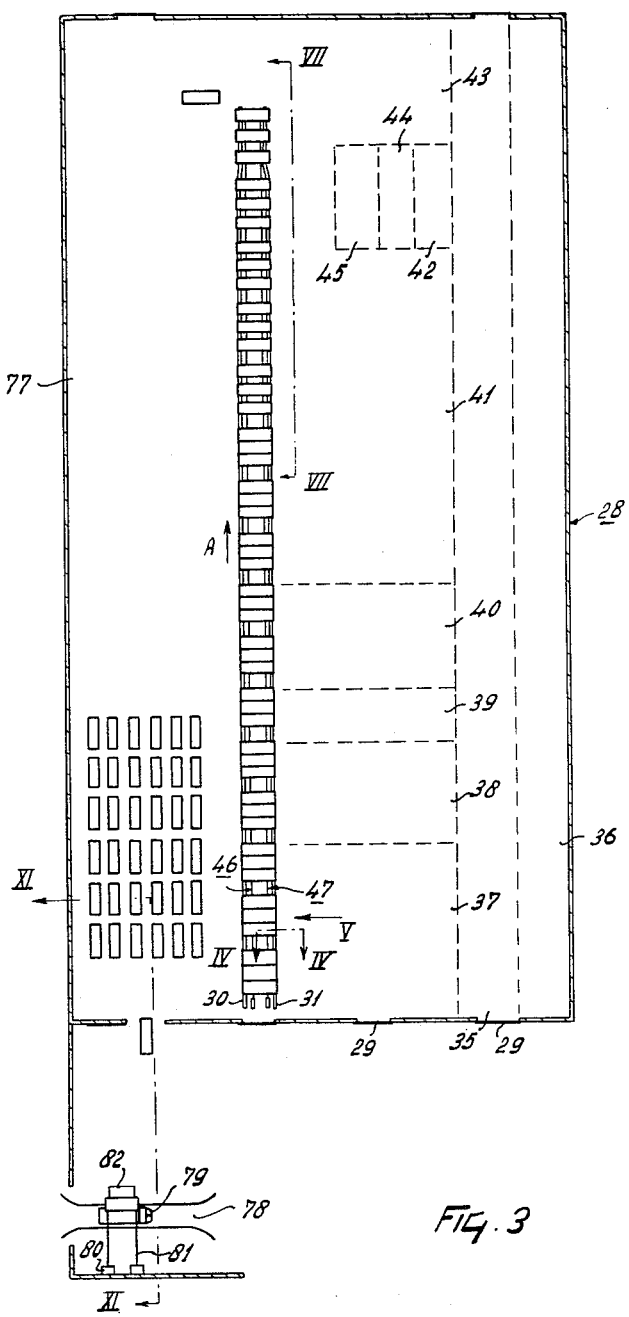
Figure 7:
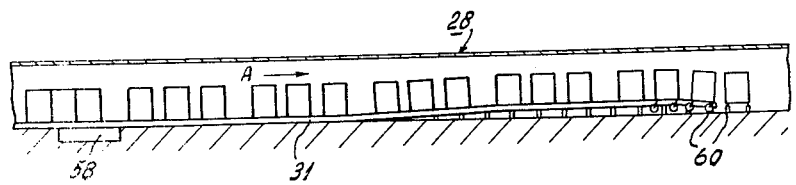
Figure 11:
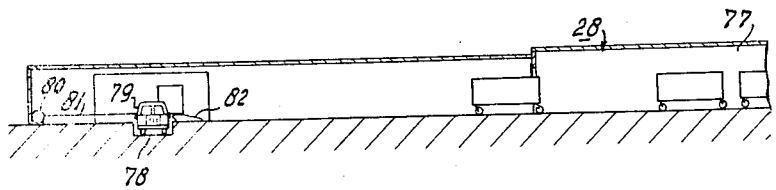
Figure 4:
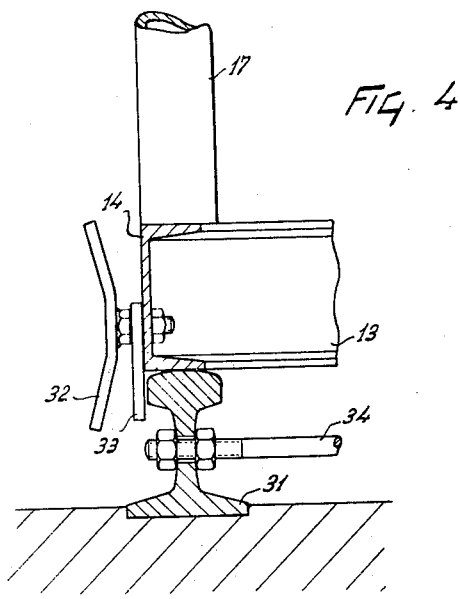

For a better understanding of the invention and to show how the same may be readily carried into effect, reference will now be made by way of example to the accompanying drawings, in which:

FIG. 1 is an elevation of a building assembled from prefabricated box-shaped sections, FIG. 2 is an elevation of a beam frame of a section, FIG. 3 shows on a reduced scale the ground plan of a factory in which the sections of buildings are manufactured, FIG. 4 is on an enlarged scale a sectional view of a part, taken on the line IV—IV in FIG. 3, FIG. 5 is a view in the direction of the arrow V in FIG. 3, FIG. 6 is on an enlarged scale a sectional view taken on the line VI—VI in FIG. 5, FIG. 7 is on a slightly enlarged scale a side elevation of part of FIG. 3, as seen from the line VII—VII in FIG. 3, FIG. 8 illustrates the fastening of a wheel to a section, FIG. 9 is a side elevation of the structure shown in FIG. 8, as seen in the direction of the arrow IX in FIG. 8, FIG. 10 is a diagrammatic side elevation of a section supported by wheels, and FIG. 11 is similar to FIG. 7, but as seen from the line XI—XI in FIG. 3.

The building shown in FIG. 1 is a house comprising a lower story composed of three-box-shaped sections 1, 2 and 3, and an upper story composed of three box-shaped sections 4, 5 and 6 which are arranged above the sections 1, 2 and 3. Each section encloses all or part of at least one living room or other space. Parts of sections 7, 8 and 9 of an adjacent house are shown joined to the house composed of the sections 1 to 6. The houses are arranged on foundation beams 10.

FIG. 2 shows a frame made from metal beams, forming the supporting structure of a box-shaped section. It will be seen that the frame has a rectangular framework of four channel-section beams 11, 12, 13 and 14, arranged at the lower side of the section. The beams 12 and 13 constitute the longer sides of the framework, and are approximately two-and-a-half times the length of the shorter sides formed by the beams 11 and 14. The beams 12 and 13 are interconnected by I-section beams 15 and 16 which extend parallel to the beams 11 and 14. At the corners of the rectangular framework formed by the beams 11 to 14 there are erected vertical beams in the form of circular-section pipes 17, 18, 19 and 20.

The beam 13 has fastened thereto, between the pipes 17 and 19, a vertical pipe 21, whereas the beam 12, between the pipes 18 and 20, has secured to it a vertical pipe 22. At their ends remote from the beam 14, the pipes 17 and 18 are interconnected by an angle-section bar 23, lying on the pipes and extending parallel to the beam 14. The pipes 19 and 20 are interconnected in the same manner by an angle-section bar 24, which extends parallel to the beam 11, while the ends of the pipes 21 and 22 are interconnected by a channel-section beam 25. Near the upper ends of the pipes 17 to 22 are arranged channel-section beams 26, extending parallel to the beams 12 and 13.

The structure shown in FIG. 2 forms the frame of, for example, the section 1 of the house shown in FIG. 1. The frames of the other sections are constructed wholly or mainly in the same manner from metal beams. In the assembled state, the rectangular framework at the lower side of the section 4 rests on the beams 23, 24 and 25 of the section 1. Also shown in FIG. 2 are joists 27 for supporting the floor boards. The sections can be completely prefabricated in a factory, which means that the frames of the sections are assembled in the factory and the walls, floors, ceilings and roofs are attached to the beams forming the frames. After the sections have been completely assembled in the factory, they can be transported to the building site, where the sections are stacked one upon the other and side by side in the desired manner and are fixed one to another to produce the finished house.

The prefabrication of the sections will now be described more fully. FIG. 3 shows a work shop 28, having a number of doors 29. During the prefabrication process, which proceeds on a production-line basis, the sections rest on two parallel rails 30 and 31 disposed on the work shop floor. Referring to FIGURE 4, the two rails are interconnected by a plurality of the rods 34. The beams 11 and 14 forming the shorter sides of the rectangular frameworks at the lower sides of the sections are disposed on the rails. From FIG. 4 it will be seen that with the aid of wing nuts 32, downwardly-orientated plates 33 are fastened to the shorter sides of the sections. These plates extend along the rails and prevent the sections from moving transversely to the longitudinal direction of the rails, so that the plates serve as guides to ensure that the sections travel along the rails.

During the prefabrication process, the sections are shifted in the direction of the arrow A along the rails (FIG. 3). The method of moving the sections will be described more fully hereinafter.

The material from which the sections are made is supplied along the path 35. In the space 36 the foundation beams 10 are made. In the space 37 the metal beams of the frame of a section are stored, and this space houses, in addition, the machines for the required preliminary working of the beams, for example saws for sawing the beams to length. In the space 38 are stored the materials required for the manufacture of the floors and the beams required for fastening the ceilings to the frames of the sections. This space 38 also houses woodworking machines such as saws for sawing beams and floor boards to length. Staircases, inner-door frames and jambs, the required pipes and conduits for the sections, etc., are stored in the space 39. In the space 40 there is provided the material for the inner walls and the outer side walls and there are also the machines required for the preparation of such material. The space 41 contains the further materials required for finishing the building, for example chimneys, baths, cupboards and kitchen equipment, sanitary equipment, material for finishing the walls, the roofing material and the ceiling material, floor coverings and wallpaper. The space 42 constitutes a spraying room for parts of the facade and the rear wall, in which the doors and the windows are to be arranged. These parts are manufactured in the space 43, where also the staircases, the cupboards and similar parts are made. The space 44 is drying room, and in the space 45 the window panes are set in the wall parts.

At the beginning of the production line, the rectangular frameworks are first assembled to form the lower sides of the sections. The beams required for these frameworks, previously cut to length in the space 37, are disposed on the rails 30 and 31 and are welded to each other. Then the assembled rectangular frameworks of the sections arranged one behind the other in the building, for example the sections 1, 2 and 3 or the sections 4, 5 and 6 of the house shown in FIG. 1, are bolted to each other in the manner in which the sections are to be fixed together during their final assembly together in the completed building. Thereafter the vertical pipes are welded to the horizontal frame beams and the further frame beams are arranged between the pipes. After these beams and pipes have been connected together, the completed frame can be coupled with continuously moving chains 46 and 47, extending parallel to the rails, by means of hooks or catches 48 (see FIGS. 5 and 6). If desired, the rectangular frameworks at the lower sides of the sections may be caused to move by the chains while the other beams and pipes are being fixed thereto.

The chains 46 and 47 consist of links 49, which are hinged to each other by horizontal pivot pins 50, extending at right angles to the direction of movement A of the chains. The part of the pin 50 lying between the links 49 is surrounded by a sleeve 51, which co-operates with sprocket wheels (not shown) driving the chain. At appropriate equal distances apart, the chain is supported by shoes 52, which prevent the chain from sagging. The two ends of the pivot pins 50 project one on each side beyond the links of the chain. Around these two ends of the pins 50 can be hooked ears 53 forming part of one of the hooks or catches 48. The catch 48 is provided with an upright lug 54, and two limbs 55 which, when the ears 53 have been hooked around the ends of a pin 50, extend along the outer sides of the links and rest on the ends of those pins 50 which are located close behind the pin around which the ears 53 are hooked ("behind" being with reference to the direction A).

When hooks or catches 48 are connected to the chains 46 and 47, the lugs 54 of the catches will come into contact with any beam resting on, and extending transversely to, the rails, so that this beam will be moved along by the chains. FIG. 5 shows part of three interconnected sections. It will be assumed here that these are the sections 1, 2 and 3 of the house shown in FIG. 1. As shown in FIGURE 5, the sections are interconnected by bolts 56 and 57. The hooks 48 are arranged so that they come into contact with the frame beam 12 of the section 1. The three interconnected sections 1, 2 and 3 are thus moved by the chains 46 and 47 and are displaced along the work shop in the direction of the arrow A.

After the frame beams have been interconnected, the metal beams are painted with red lead. During these operations, the three interconnected sections are displaced by the chains 46 and 47 to an extent such that they arrive opposite the space 38.

In the meantime, the frames of, for example, the sections 4, 5 and 6 of the house shown in FIG. 1, have been assembled at the beginning of the production line and have been connected with each other. When the first three sections have arrived at the space 38, the beams for supporting the floors and the ceilings are arranged between the frame beams of the sections, and the floor boards are laid. During the disposition of these beams and floor boards, the sections are displaced over a distance such that, at the termination of such operations, the sections arrive opposite the space 39. At this position the inner door frames, which may have been previously painted, are arranged in the sections, as well as the various pipes and conduits such as the electricity conduits and the water pipes to be arranged in the walls and above the ceilings or below the floors. Then the sections arrive opposite the space 40, where the material for the inner walls and the outer side walls is stored. At this stage on the production line the inner walls and the sides are arranged at least for the major part in the sections.

Meanwhile the sections are displaced to the position of the space 41 by the chains 46 and 47. At this position the chimneys and the baths are arranged in the sections. Then the covering layers are applied to the inner walls and the ceilings. The appropriate sections, for example the sections 4, 5 and 6, are then provided with the roofing material. Subsequently the fixed cupboards and the kitchen equipment are arranged in place in the appropriate sections, as well as wash stands and toilets.

The sections are in the meantime displaced by the chains to an extent such that they come above a working pit 58 located beneath the production line (see FIG. 7). In the working pit the bolts interconnecting the sections are loosened. When the bolts interconnecting, for example, the section 1 with the section 2, have been removed, the section 1 is displaced alone. At the same time the section 3 is disengaged from the section 2. When the section 1 has been moved away from the section 2 by a short distance, hooks 48 are coupled with the chains 46 and 47, so that the latter section is again moved along by the chains. Similarly, when the section 2 has been displaced by a short distance from the section 3, hooks are again applied, so that the section 3 is also moved along by the chains.

During this time, parts of the facade at the rear wall of te building are fixed to the sections. Then the wall hangings and the floor covering can be provided in the sections, which are ready for the final finishing. The sections are then ready for transport.

From FIGS. 3 and 7 it may be seen that the rails 30 and 31 along which the sections are displaced, are bent upwardly and towards each other near the end of the production line. Thus the completed sections are raised above the ground as they are moved along. It is then possible to attach wheels 60 to the lower sides of the sections, as is shown in detail in FIGS. 8, 9 and 10. From these figures it will be apparent that a wheel 60 is freely rotatable about a horizontal axle 61 and is fastened with the aid of an arm 62 to a vertical shaft 63. The axes of the axle 61 and shaft 63 do not intersect. The shaft 63 is journalled with the aid of a ball-bearing 64 in a housing 65. Two flanges 66 and 67 are fastened to the housing, the flanges being at right angles to each other. Two wheels are intercoupled by a beam 68, which interconnects the upright flanges 66 of the housings 65 of such two wheels. The flanges 67 associated with the two wheels interconnected by a frame beam 68, are spaced apart by a distance which is equal to, or slightly greater than, the length of the shorter sides of a section. Thus, at each end of the section, there are arranged two interconnected wheels, the two frame beams 68 joining these wheels extending along the shorter beams of the rectangular framework at the lower side of the section. The beams 68 are fastened to such shorter beams by bolts 69, to which arms 70 are fixed for ease of manipulating the bolts.

From FIG. 10 it will be seen that levers 73 are fastened to the arms 62 of the wheels at one end of the section, these levers 73 being interconnected by a bracket 74, to which a draw arm 76 is attached with the aid of a pin 75.

These wheels at one end of the section can be steered with the aid of the draw rod 76.

The ends of the rails are bent over downwardly from their raised parts so that, when the sections move onwards the sections are lowered until the wheels contact the floor of the work shop.

At the end of the production line, the chains 46 and 47 are guided downwardly, so that the hooks or catches 48 are automatically detached from the sections and can be removed from the chains. Then the completed sections can be wheeled towards the space 77, where the sections associated with one particular building can be arranged one after the other as a group.

A loading pit 78 is dug outside the work shop (see FIGS. 3 and 11) for facilitating loading of the sections on to transport vehicles. A flat-decked vehicle 79 may be driven down ramps into the pit. A section to be loaded is wheeled to a position at one side of the loading pit, and is then dragged with the aid of winches 80 and cables 81 on to a bridge 82, which is located at the side of the loading pit between the section and the pit. When the section rests on the bridge 82, the wheels 60 and the associated equipment are removed from the section, after which the section can be shifted on to the deck of the vehicle and secured there.

The method described above, in which sections intended to be adjacent one another in the final building are interconnected during the major part of their manufacture on the production line, has the advantage that these sections can be adapted to each other so as to be of accurate fit. Since during the manufacturing process these adjacent sections are simultaneously worked upon, they satisfactorily fit one to another whereas the working process can be carried out relatively rapidly so that an economy in cost is effected. Because the sections are made on a continuously moving line, a comparatively small labor force suffices to attain a high output in production.

It will be obvious that, although the manufacture is described herein for sections of a building comprising two stories of three sections each, the sections intended for use in differently shaped buildings can be produced in the same manner. The sections may themselves be differently composed instead of being built up from a metal skeleton with floors, walls and so forth attached thereto.

What we claim is:

1. A method of producing large prefabricated box-shaped sections to be assembled in a building in predetermined relationships which comprises the steps of placing the frameworks of said sections on an assembly line including transport means adapted to move said frameworks therealong, detachably connecting said frameworks of at least two of said sections, fabricating said sections while same are firmly attached together in said predetermined relationships, while moving same along said assembly line and thereafter disconnecting said detachable connections between said sections, whereby said sections may be transported individually for assembly at the site for said building.

2. A method of producing large prefabricated box-shaped sections to be assembled in a building structure in predetermined relationships which comprises the steps of placing the frameworks of said sections on an assembly line including transport means to move said frameworks therealong, firmly attaching the frameworks of said sections together in a readily detachable connection in said predetermined relationships, while moving same along said assembly line fabricating said sections while same are attached together, and detaching said sections by disconnecting said readily detachable connections, whereby said sections may be transported to the site of said building individually.

3. A method of producing large prefabricated box-shaped sections to be assembled in a building structure in predetermined relationships which comprises the steps of placing frameworks of said sections on a movable assembly line in said predetermined relationships, connecting said frameworks together by readily detachable connections, fabricating said sections on said frameworks in said predetermined relationships while moving same along said assembly line, and disconnecting said detachable connections between said sections, whereby said sections may be transported to the site of said building structure individually.

4. A method of prefabricating large box-shaped sections to be assembled into buildings which comprises the steps of placing frameworks of said sections on a continuously moving assembly line, detachably connecting said frameworks, and fabricating said sections on said frameworks while same are moving along said line, and thereafter disconnecting the detachable connections between said sections, whereby said sections are individually transportable to the site of said building.

5. A method of prefabricating large box-shaped sections to be assembled into buildings which comprises the steps of placing the frameworks of said sections on a pair of rails, detachably securing said frameworks together, attaching projections to said frameworks adjacent said rails, moving an endless member under said framework parallel to said rails, removably attaching said sections to said endless member, and moving said sections along said rails while fabricating said sections, said projections limiting movement of said sections transverse to the direction of movement of said sections along said rails.

6. A method of producing large prefabricated box-shaped sections to be assembled in a building structure in predetermined relationships which comprises the steps of placing frameworks of said sections on a continuously moving assembly line in said predetermined relationships, detachably connecting said frameworks together in said predetermined relationships, fabricating said sections on said frameworks while moving in said predetermined relationships along said assembly line, and progressively disconnecting said detachable connections between the most forward of said connected sections and the following section, whereby each said section so disconnected thereafter may be moved individually along said assembly line.

7. A method in accordance with claim 6, wherein said assembly line include a continuous conveyor chain, and includes the additional step of attaching said sections to said chain by means of a hook carried by said chain which hooks behind a section.

8. A method in accordance with claim 6, comprising the additional step of connecting ground-engaging rotary members to each of said sections after the section involved has been disconnected from the other sections.

9. A method in accordance with claim 8, comprising the additional steps of removing said sections from the end of said assembly line, drawing at least one of said sections over a vehicle transportation means, and disconnecting said ground-engaging rotary members from said section.

10. In the process of manufacturing large box-shaped sections to be assembled into a building, said process comprising the placing of frameworks of said sections on a substantially continuously moving assembly line, detachably connecting said frameworks, fabricating said sections on said frameworks while same are moving along said line, and disconnecting said detachable connections between said sections, the use of a conveyor belt continuously moving said sections during the manufacturing process.

11. A use in accordance with claim 10 which includes the use of rails substantially coextensive with said belt for supporting said sections and along which said sections are moved.

12. A use in accordance with claim 11, wherein said rails are higher relative to the ground nearer the end of said conveyor belt than at the beginning thereof.

13. A new use in accordance with claim 12, wherein said rails are closer together near the end of said conveyor belt than at the beginning thereof.

14. A use in accordance with claim 11 wherein at least one working pit is provided under said rails.

15. A use in accordance with claim 14 wherein said pit is located near the end of said conveyor belt.

16. A use in accordance with claim 10 wherein said conveyor belt constitutes a chain.

17. A method of producing large prefabricated box-shaped sections to be assembled into a building in predetermined relationship, said box-shaped sections being rectangular in plan and including a framework of metal beams, which comprises the steps of placing said frameworks with their lengths crosswise on a movable assembly line means and firmly attaching same together by readily detachable connections in said predetermined relationship, continuously moving and fabricating said sections along said assembly line means, and disconnecting said readily detachable connections and separating said sections while on said assembly line means, whereby said sections may be transported to the site of said building individually.

References Cited by the Examiner

UNITED STATES PATENTS

| | | | |
|---|---|---|---|
| 1,750,130 | 3/1930 | Romine | 29—200 |
| 1,772,735 | 8/1930 | Romine | 29—430 |
| 2,154,142 | 4/1939 | Whelan | 20—2 |
| 2,287,229 | 6/1942 | Carpenter | 20—2 |
| 2,356,540 | 8/1944 | Schwinn | 29—200 |
| 2,391,510 | 12/1945 | Pioch et al. | 29—430 X |
| 2,779,092 | 1/1957 | Gordon | 29—430 |

OTHER REFERENCES

Popular Mechanics Magazine, vol. 95, No. 6, June 1951 (page 126 relied on).

WHITMORE A. WILTZ, *Primary Examiner.*

CHARLIE T. MOON, *Examiner.*